JOHN W. SUTTON.

Improvement in Rubber Covers for Flat Belt Pulleys.

No. 125,228. Patented April 2, 1872.

WITNESSES:
E. J. Howard
Geo. L. Dow

INVENTOR:
John W. Sutton
PER Humphrey & Stuart
ATTORNEYS.

125,228

UNITED STATES PATENT OFFICE.

JOHN W. SUTTON, OF AKRON, OHIO.

IMPROVEMENT IN RUBBER COVERS FOR FLAT-BELT PULLEYS.

Specification forming part of Letters Patent No. 125,228, dated April 2, 1872.

SPECIFICATION.

I, JOHN W. SUTTON, of Akron, in the county of Summit and State of Ohio, have invented a Flat-Belt Pulley-Cover, of which the following is a specification:

*Nature and Object of the Invention.*

The purpose of my invention is to furnish an appliance for flat-belt pulleys, to increase their surface friction and prevent the belts slipping thereon; and I accomplish this object by constructing belts of vulcanized India rubber, with a lining of raw or unvulcanized rubber, so made as to be readily and easily applied and cemented to the surface of flat-belt pulleys.

*Description of the Accompanying Drawing.*

Figure 1:
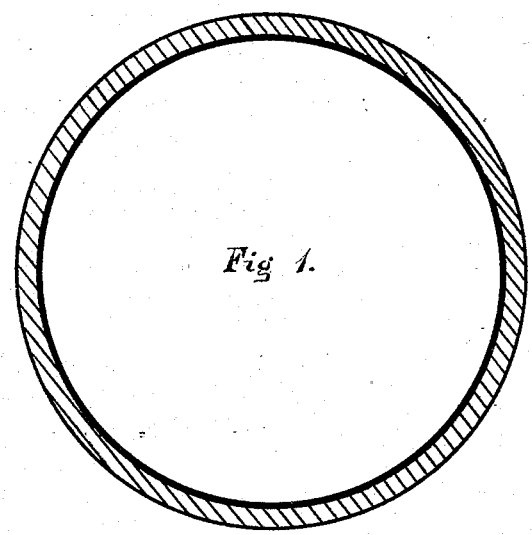
Figure 3:
Figure 2:
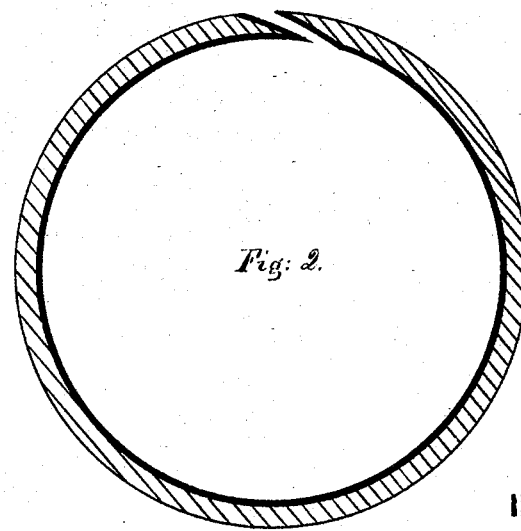

Figure 1 is a closed pulley-cover. Fig. 2 is a view of an open pulley-cover, showing the manner of joining the ends; and Fig. 3 is a full sized cross-section of a cover for a three-inch pulley.

*General Description.*

I make said pulley-covers in the following manner: Upon a strip of cloth of the desired width and length is spread a thin coat of pure or raw rubber; upon this is spread a layer, of any desired thickness, of rubber, prepared in the usual manner for making elastic vulcanized rubber articles; and is then cured by heating in the usual manner. The cloth is then removed from the inside coat of raw rubber by moistening it with benzine, leaving a belt of elastic vulcanized rubber having an inside coating of raw rubber to cement the cover to the surface of the pulley, as appears in the drawing hereto attached, wherein the broad black lines indicate the raw rubber, and the shaded portion the vulcanized rubber.

The open cover is made in the same manner, except that the ends are shaved down to a thin edge, and a layer of raw rubber is placed upon the upper surface of one end and upon the under surface of the other, for the purpose of uniting them together upon the pulley.

To apply the closed cover, cleanse the surface of the pulley perfectly free from grease, &c.; moisten the inside coat of pure rubber with benzine; stitch the cover, and slip it on the pulley. The open pulley-cover is put on by the surface of the pulley having been cleaned as in case of the closed cover, moistening the raw rubber on the inside of that end of the cover that has raw rubber on the upper surface for joining, with benzine, and slipping the end so moistened between the belt and pulley; as soon as the moistened rubber has "set" upon the pulley, stretch the cover sufficiently to go around the pulley, and lap as far as the raw rubber extends on the upper surface, and fasten the cover to the belt; moisten the rest of the raw rubber upon the inside of the cover with benzine and turn the pulley, letting the cover go to its place slowly, and join the two ends by moistening the raw rubber on each with benzine and pressing in any convenient way.

These covers may be made without the inside lining of raw rubber, in which case a cement is used to fasten them to the pulley.

I do not claim the use of rubber upon the surface of pulleys to increase their surface friction.

*Claim.*

I claim as my invention—

The flat-belt pulley-cover, constructed substantially as and for the purpose hereinbefore set forth.

JOHN W. SUTTON.

Witnesses:
 B. F. GOODRICH,
 T. S. BRADFORD.